(12) United States Patent
Hornung

(10) Patent No.: US 12,156,513 B2
(45) Date of Patent: Dec. 3, 2024

(54) MOVABLE LIVESTOCK GRAZING ENCLOSURE

(71) Applicant: Matthew Hornung, Dodge City, KS (US)

(72) Inventor: Matthew Hornung, Dodge City, KS (US)

( * ) Notice: Subject to any disclaimer, the term of this patent is extended or adjusted under 35 U.S.C. 154(b) by 0 days.

(21) Appl. No.: 18/151,253

(22) Filed: Jan. 6, 2023

(65) Prior Publication Data

US 2024/0224933 A1    Jul. 11, 2024

(51) Int. Cl.
*A01K 3/00*    (2006.01)
*A01C 7/08*    (2006.01)
*A01K 5/01*    (2006.01)

(52) U.S. Cl.
CPC ............. *A01K 3/001* (2021.08); *A01C 7/08* (2013.01); *A01K 5/0107* (2013.01)

(58) Field of Classification Search
CPC ...................................... A01K 3/001
See application file for complete search history.

(56) References Cited

U.S. PATENT DOCUMENTS

| | | | |
|---|---|---|---|
| 5,868,100 A | 2/1999 | Marsh | |
| 6,062,165 A | 5/2000 | Sieling | |
| 6,581,546 B1 | 6/2003 | Dalland et al. | |
| 6,854,426 B2 | 2/2005 | Campbell et al. | |
| 7,123,153 B2 | 10/2006 | Thorstensen et al. | |
| 10,098,324 B2 | 10/2018 | Baize | |
| 10,477,834 B2 | 11/2019 | Greive et al. | |
| 10,827,726 B2 | 11/2020 | Rosales | |
| 2005/0284413 A1 | 12/2005 | Boesch | |
| 2008/0276879 A1 | 11/2008 | Marsh | |
| 2015/0123060 A1 | 5/2015 | Gross | |
| 2019/0110430 A1* | 4/2019 | Badiou | ............... A01K 1/0035 |
| 2019/0235087 A1 | 8/2019 | Greive | |
| 2020/0128785 A1 | 4/2020 | Bassett | |
| 2021/0048833 A1 | 2/2021 | Suckert | |
| 2021/0092934 A1 | 4/2021 | Greive | |
| 2021/0204522 A1 | 7/2021 | Kameyama | |
| 2021/0267161 A1 | 9/2021 | Drumm | |
| 2021/0329884 A1 | 10/2021 | Bassett | |
| 2021/0400908 A1 | 12/2021 | Smith | |
| 2022/0015390 A1 | 1/2022 | Farmer | |

* cited by examiner

*Primary Examiner* — Jessica B Wong
(74) *Attorney, Agent, or Firm* — Trenner Law Firm, LLC; Mark Trenner

(57) ABSTRACT

A movable livestock grazing enclosure is disclosed for regenerative grazing in agriculture. An example movable livestock grazing enclosure may include a front boom, and a first side boom and a second side boom both attached to the front boom to form a contained grazing paddock. The movable livestock grazing enclosure may also include a trough on at least one of the front boom, the first side boom, and the second side boom. The trough provides at least one of water, food, and food supplements for livestock. The movable livestock grazing enclosure may also include a head unit attached to the front boom. The head unit is configured to move the contained grazing paddock to a predetermined location for grazing the livestock within the contained grazing paddock. In an example, the head unit is at least partly automated.

17 Claims, 5 Drawing Sheets

MOVABLE LIVESTOCK GRAZING ENCLOSURE

BACKGROUND

Cattle graze and deposit manure on the land they feed on. In the past, this same land would also be used for crops, forming a natural nutrient loop. More recently, cattle have been kept in separate pastures, and the manure moved to cropland that needed it. Hauling manure increases costs and synthetic fertilizers are not environmentally friendly, leading to societal pressure on agriculture. When managed correctly, however, livestock can build soil health and reduce having to add manure and synthetic fertilizers to cropland.

This principle, known as "regenerative grazing," is a relatively new agricultural practice to build soil health by effectively managing livestock. Regenerative grazing can be accomplished using wire fencing to retain the cattle in desired areas. When the cattle need to be moved, however, the fencing also needs to move. Wireless fences can also be used, but this requires fitting the cattle with electric collars. Both of these techniques typically require human intervention to go out and move the cattle and the containment system, whether that be wired or wireless, sometimes as frequently as on a daily basis.

DETAILED DESCRIPTION

Figure 1:
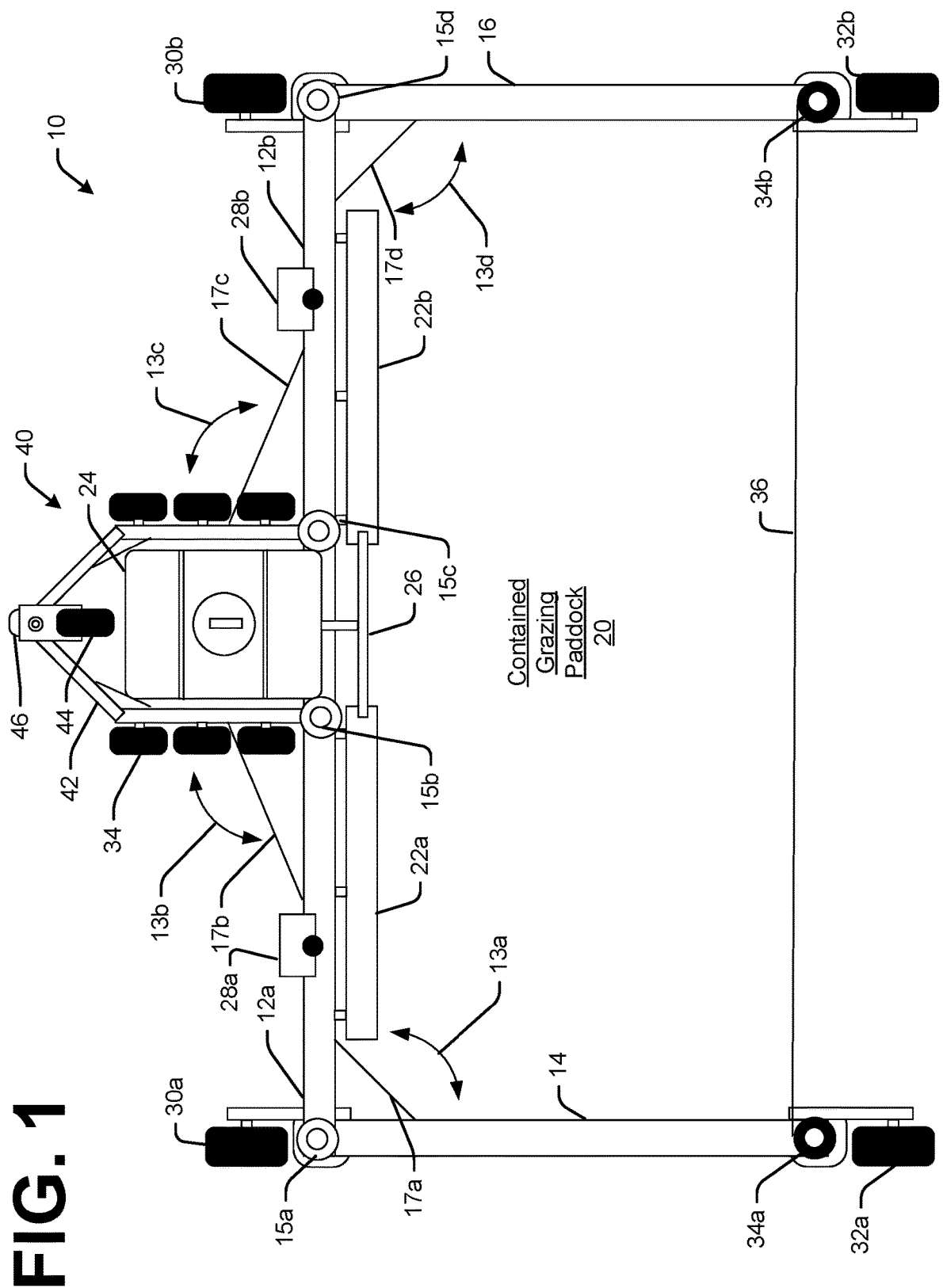
FIG. 1 is a top view of an example of a movable livestock grazing enclosure for regenerative grazing in agriculture.

A movable livestock grazing enclosure is disclosed which can be incorporated into a regenerative agriculture operation. A tenet of regenerative grazing is to keep the grazing animals close to each other and moving throughout the field. This mimics large herd animals moving across the plains, much like the mass migration of buffalo across the plains. This creates improved soil conditions for the next plant growing cycle.

An example of the movable livestock grazing enclosure for regenerative grazing in agriculture includes a front boom, a first side boom, and a second side boom. The first side boom and the second side boom are both attached to the front boom to form a contained grazing paddock. The movable livestock grazing enclosure may also include a trough on at least one of the front boom, the first side boom, and the second side boom. The trough provides at least one of water, food, and food supplements for livestock. The movable livestock grazing enclosure may also include a head unit attached to the front boom. The head unit is configured to move the contained grazing paddock to a predetermined location for grazing the livestock within the contained grazing paddock. In an example, the head unit is at least partly automated. In addition, the contained grazing paddock can be sectionalized further to incorporate different types of livestock or even livestock and poultry.

A portable trailer with boom style wings with a water tank and other supplemental feeding mechanisms attached thereto. Looking from the top view, a trailer system as outlined with "sprayer like" booms folding horizontally and rearwardly with mechanism attached to contain, protect, water, and feed livestock. At the horizontal end of each boom, a pivotable wheel assembly forms a support joint to a rearward boom assembly. At the end of each rearward boom assembly, a pivotable wheel support assembly is equipped with one or more wire reel assemblies which in turn connects the rearward boom assemblies together forming a rectangular enclosure.

The movable livestock grazing enclosure can be moved incrementally throughout the field to be grazed, either manually (e.g., pulled by a truck or tractor) or under its own power. In an example, the head unit may include a controlled pivotable wheel at the front end to provide steering control from an external guide system. GPS, guidance, radar, and other automated systems may be provided, in combination with field maps to track the movable livestock grazing enclosure in the field. A timer and a slow crawl function can be programmed into the controller based at least in part on factors such as, but not limited to, grazing field conditions and the amount of the desired time to graze each area of the field.

In an example, the movable livestock grazing enclosure also provides a source for water, food, and/or supplemental nutrients. This helps to provide everything the livestock needs so that the livestock does not have to make its way back to water which would otherwise defeat the purpose of maintaining the livestock in a predetermined location in the field.

In an example, a seed distribution system may be provided with the movable livestock grazing enclosure, so that seed is spread in the field. Seed may be spread within the contained grazing paddock and/or outside of the contained grazing paddock. When spread within the contained grazing paddock (or the contained grazing paddock is otherwise moved over the seed spread in the field), the livestock step on the seed and plant the seed into the ground, along with fertilizing the seed.

The movable livestock grazing enclosure is a practical and cost-effective technique to implement sectionalized grazing and promote regenerative grazing.

Before continuing, it is noted that as used herein, the terms "includes" and "including" mean, but is not limited to, "includes" or "including" and "includes at least" or "including at least." The term "based on" means "based on" and "based at least in part on."

Figure 2:
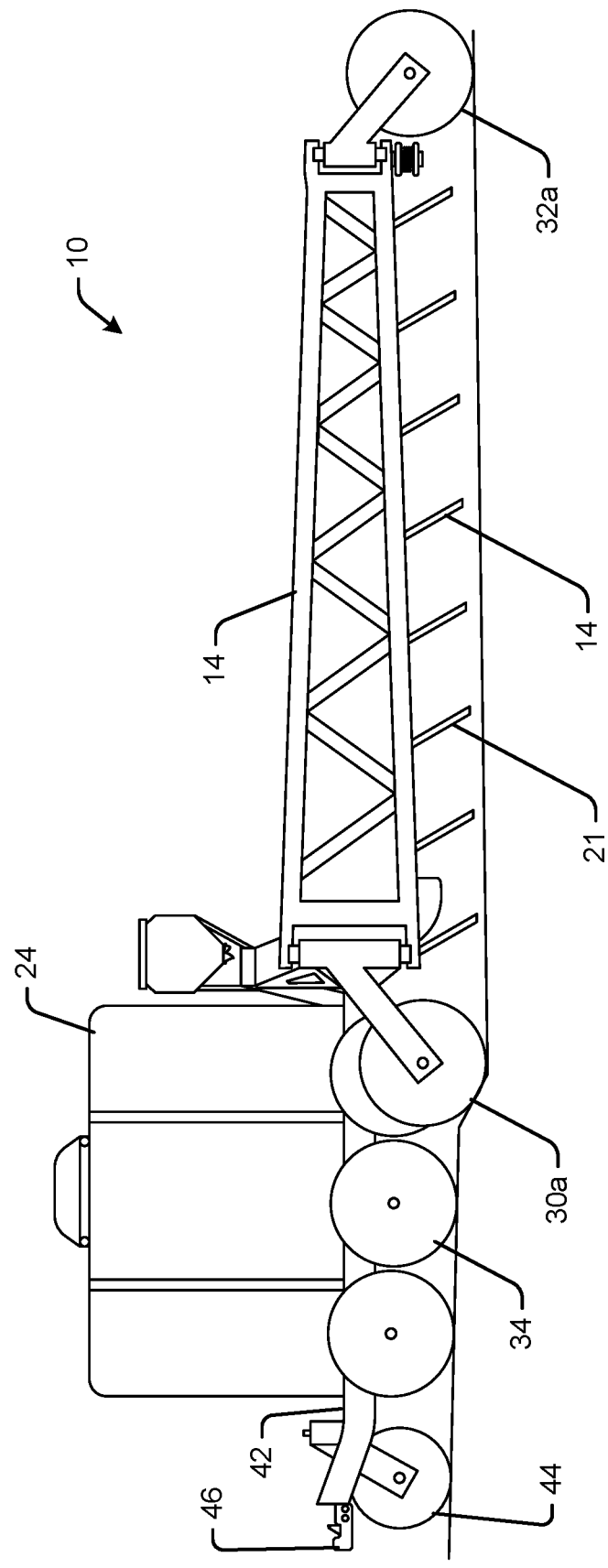
FIG. 2 is a side view of an example of a movable livestock grazing enclosure for regenerative grazing in agriculture.

FIG. 1 is a top view of an example of a movable livestock grazing enclosure 10 for regenerative grazing in agriculture. FIG. 2 is a side view of an example of a movable livestock grazing enclosure 10 for regenerative grazing in agriculture. The example movable livestock grazing enclosure 10 is shown as it may include a front boom 12a, 12b, a first side boom 14, and a second side boom 16 that forms a grazing paddock 20.

In an example, the front boom includes separate boom structures forming the overall front boom 12a, 12b. Other examples are also contemplated. The booms 14, 16, may include spring loaded and/or flexible (e.g., tubing, wire, plastic) rods 21. The rods 21 are configured to flex over and better conform to a contour of the land (e.g., a slope such as a hill or valley). This aids as a lower railing or barrier to keep the livestock in the grazing paddock 20. For example, the rods 21 may help keep smaller animals like calves, sheep, chicken, pigs, etc. from leaving the grazing paddock 20.

Both the first side boom 14 and the second side boom 16 are attached to the front boom 12a, 12b to form a contained grazing paddock 20 in a field to be grazed. The contained grazing paddock 20 may be moved around in the field to promote intentional grazing in desired locations in the field to be grazed, for example for fertilizing the ground for the future planting of crops in the field.

In an example, the booms are collapsible so as to take up a smaller footprint. For example, a smaller footprint may be more desirable for storage. In an example, the booms are attached to one another at pivot points 15a-d and can be folded inward or outward, e.g., as illustrated by arrows 13a-d. A cable 17a-d may be provided to prevent overextension. The booms may also be resized (e.g., extended or retracted) to be larger or smaller to change the size of the contained grazing paddock 20.

In an example, the movable livestock grazing enclosure 10 includes a pivotable wheel assembly 30a, 30b at each horizontal end of the front boom 22a, 22b, respectively. The pivotable wheel assembly 30a, 30b forms a support joint to a corresponding one of the first side boom 14 and the second side boom 16.

In an example, the movable livestock grazing enclosure 10 includes a pivotable wheel support assembly 32a, 32b at the end of the front first side boom 14 and the end of the second side boom 16.

In an example, the movable livestock grazing enclosure 10 includes at least one wire reel 34a, 34b connecting a wire 36 across a rear portion of the contained grazing paddock 20. For example, the wire reels 34a, 34b may be provided at the pivotable wheel support assembly 32a, 32b, respectively. The wire 36 can be extended between the wire reels 34a, 34b to enclose the contained grazing paddock 20 along all sides.

Still other booms (not shown) and/or wires (not shown) may be provided to section off the contained grazing paddock 20. For example, the contained grazing paddock 20 may be sectioned for different types of livestock and/or poultry within the contained grazing paddock 20.

The example movable livestock grazing enclosure 10 is also shown including a trough 22a, 22b. The trough 22a, 22b may include separate trough structures or may be provided as a single trough. The trough 22a, 22b may be provided (e.g., by mounting or formed as a portion thereof) on the front boom 12a, 12b (as shown in FIG. 1). The trough 22a, 22b may instead or also be provided on the first side boom 14 and/or on the second side boom 16. The trough 22a, 22b may be implemented for providing water, food, and/or food supplements for the livestock grazing in the contained grazing paddock 20.

In an example, the movable livestock grazing enclosure 10 includes one or more water tank 24 for water storage. In an example, the movable livestock grazing enclosure 10 includes one or more sprayer assembly 26 to spray water for the livestock. In an example, the movable livestock grazing enclosure 10 may also include a feed tank and/or a feed supplement tank. The feed supplement tank may be provided as part of or mounted with the water tank 24. The feed tank(s) 28a, 28b may be provided separately. It is noted that the term "tank" is used broadly herein to refer to any suitable container or other device to store water, feed, and/or feed supplement. Various other supplemental storage and distribution systems may also be provided. For example, the moveable livestock grazing enclosure 10 may include a seed distributing assembly (e.g., mounted on one or more of the booms) to spread seed around the contained grazing paddock 20.

The example movable livestock grazing enclosure 10 is also shown as it may include a head unit 40. The head unit 40 may be attached to the front boom 12a, 12b. The example head unit 40 may include a support structure 42 and one or more wheels 44. The head unit 40 is configured to move the contained grazing paddock 20 to a predetermined location in a field for grazing the livestock within the contained grazing paddock 20.

In an example, the head unit 40 includes a trailer hitch 46 for manual or semi-manual movement (e.g., via a vehicle). In another example, operation of the head unit 40 is at least partly automated, and may be fully automated. By way of example, the head unit 40 may be programmed to move incrementally through the field to be grazed. An onboard power system (e.g., gas engine and/or electric motor) may be provided for the head unit 40 to move the head unit 40 through the field to be grazed.

In an example, the head unit 40 includes a drive wheel 44. The drive wheel 44 may be controlled by an external source controller (see, e.g., FIG. 3 discussed below). The external source controller may include a guidance system. The guidance system tracks a path through the field to be grazed (see, e.g., FIG. 5, discussed below). In an example, the guidance system controls speed and position of the contained grazing paddock in the field to be grazed based at least in part on grazing conditions of the field to be grazed.

Before continuing, it should be noted that the examples described above are provided for purposes of illustration, and are not intended to be limiting. Other devices and/or device configurations may be utilized to carry out the operations described herein.

Figure 3:
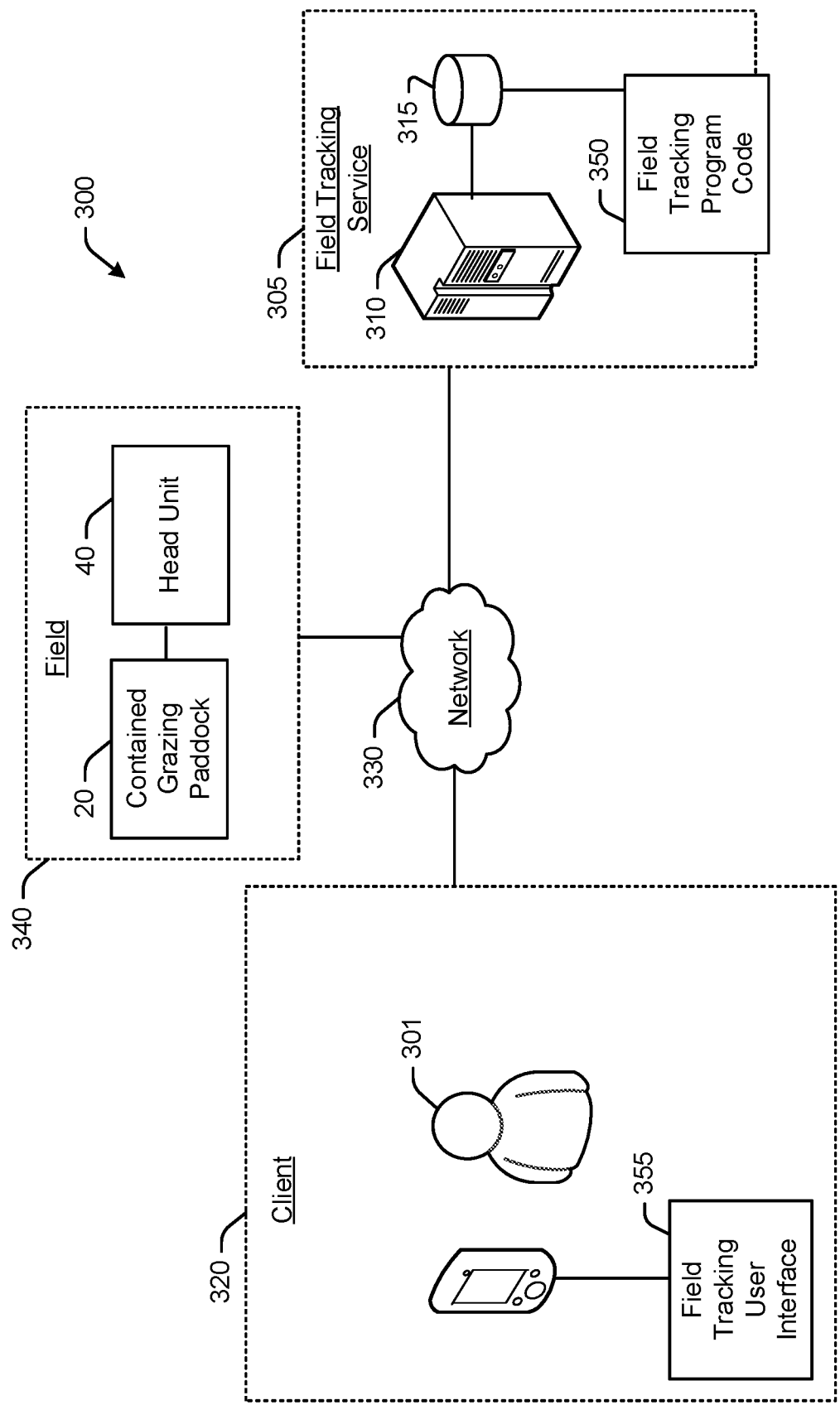
FIG. 3 is a block diagram of a control system for an example of a movable livestock grazing enclosure for regenerative grazing in agriculture.

FIG. 3 is a block diagram of a control system 300 for an example of a movable livestock grazing enclosure 10 for regenerative grazing in agriculture. The high-level block diagram illustrates an example networked computer system which may be implemented with the movable livestock grazing enclosure 10. System 300 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. In an example, the system 300 implements features of self-driving according to a regenerative grazing plan in agriculture.

Each of the computing devices of the system 300 may include memory, storage, and a degree of data processing capability at least sufficient to manage a communications connection either directly with one another or indirectly (e.g., via a network). At least one of the computing devices is also configured with sufficient processing capability to execute the program code described herein for implementing a regenerative grazing plan in agriculture.

In an example, the system 300 may include a host 310 providing a grazing service 305. The service 305 may be accessed by a user 301 via a client device 320 (e.g., the user's mobile phone executing an app 355). For purposes of illustration, the service 305 may be an online data processing service executing on a host 310 configured as a server computer with computer-readable storage 315.

The client 320 may be any suitable computer or computing device capable of accessing the host 310. As already noted, the client 320 may be the user's mobile phone executing the app 355. Host 310 and client 320 are not limited to any particular type of devices. Although, it is noted that the operations described herein may be executed by program code 350 residing on the client 320 on one or more network 330, such as a local area network (LAN) and/or wide area network (WAN), the Internet or other mobile communications network (e.g., a 3G, 4G or 5G or next generation mobile device network). The host 310 and client 320 may be provided on the network 330 via a communication connection, such as via an Internet service provider (ISP). In this regard, the client 320 is able to receive input from the head unit of the movable livestock grazing enclosure 10, and to provide instruction to the head unit of the movable livestock grazing enclosure 10 to implement the regenerative grazing plan.

In addition, the system 300 may include at least one source 315 of content, and/or the service 305 may be operable to communicate with at least one remote source 340 of content. Content may include, but is not limited to, field data, crop rotation, manure density, feed, water, and supplement instructions, etc. for operation of the movable livestock grazing enclosure 10. For example, the source 340 may include databases for providing information, applications for providing application data, storage resources for providing online storage facilities. There is no limit to the type or amount of content that may be provided by the source. In addition, the content may include unprocessed or "raw" data, or the content may undergo at least some level of processing.

Figure 4:
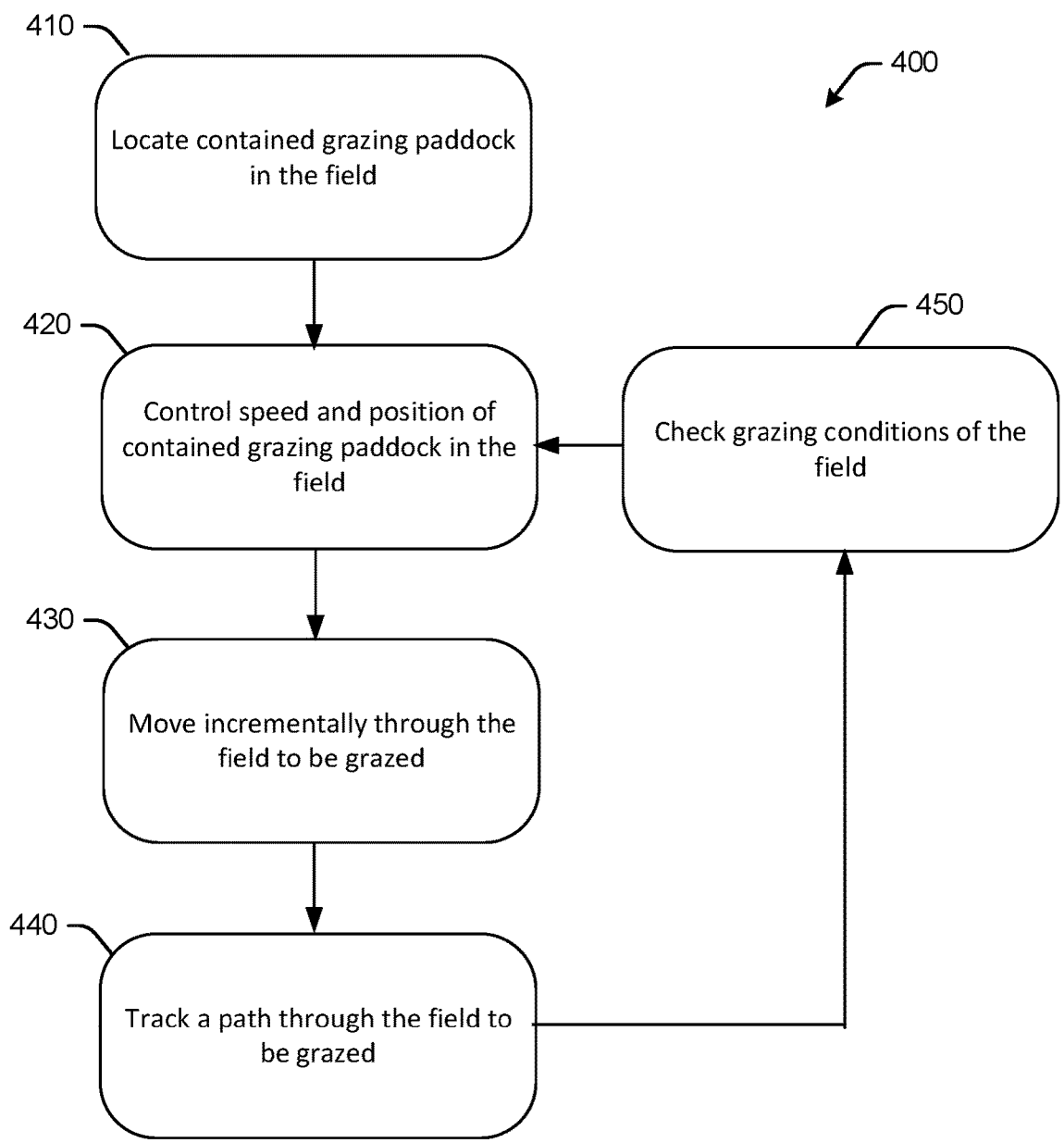
FIG. 4 is a flowchart illustrating example operations which may be implemented for a movable livestock grazing enclosure for regenerative grazing in agriculture.

FIG. 4 is a flowchart illustrating example operations 400 which may be implemented for a movable livestock grazing enclosure for regenerative grazing in agriculture. In an example, the components and connections depicted in the figures may be used.

Operation 410 includes locating a contained grazing paddock in the field. Operation 420 includes controlling the speed and position of the contained grazing paddock in the field. Operation 430 includes moving the movable livestock grazing enclosure 10 incrementally through the field to be grazed. Operation 440 includes tracking a path through the field to be grazed. Operation 450 includes checking grazing conditions of the field, and continuing again with operations 420-440 to effect operation of the movable livestock grazing enclosure 10 according to a plan for regenerative grazing in agriculture The operations shown and described herein are provided to illustrate example implementations. It is noted that the operations are not limited to the ordering shown. Still other operations may also be implemented.

Figure 5:
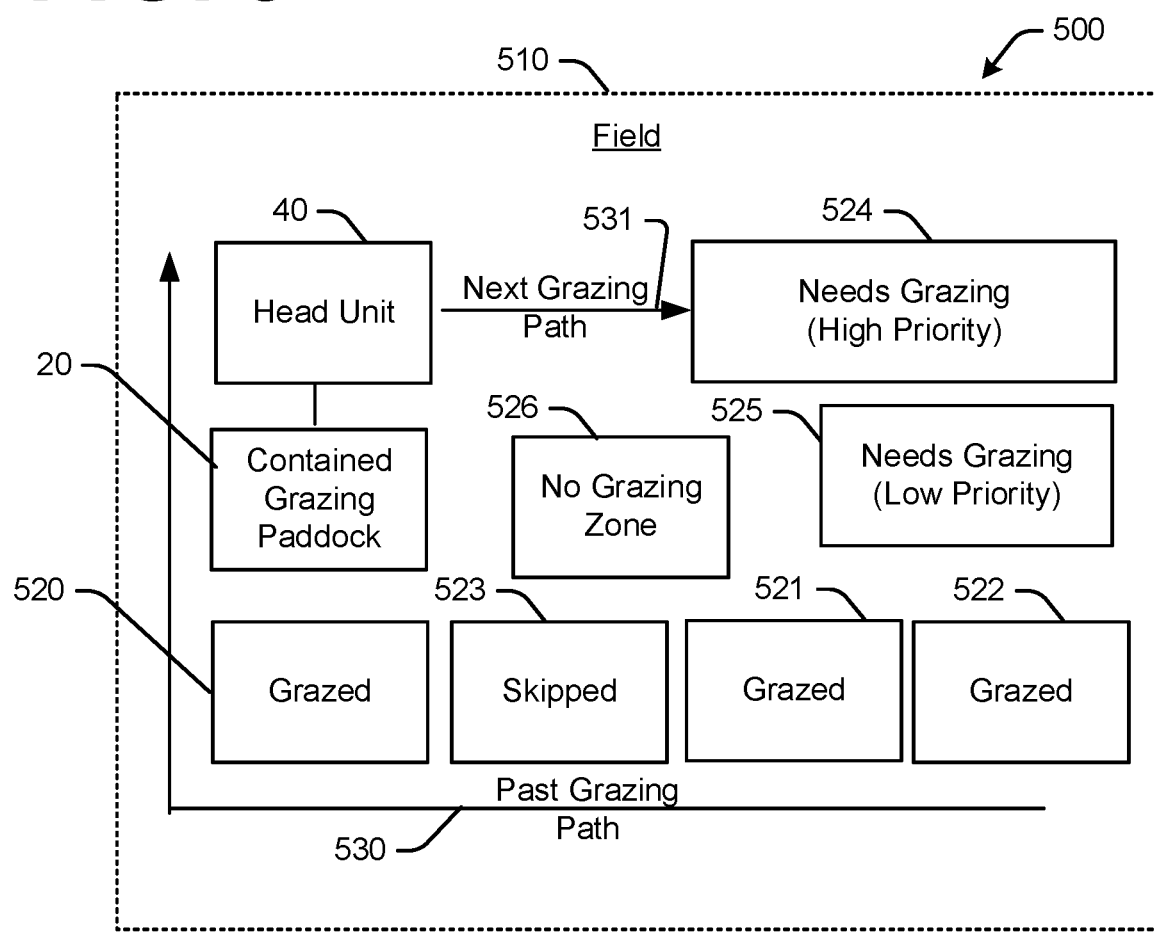
FIG. 5 is an illustration showing an example of operating a movable livestock grazing enclosure for regenerative grazing in agriculture.

FIG. 5 is an illustration showing an example of operating a movable livestock grazing enclosure 10 for regenerative grazing in agriculture. According to this example, a plan 500 is generated for a field 510 to move the head unit 40 for the contained grazing paddock 20 of the movable livestock grazing enclosure 10. The plan may include locations in the field 510 which have already been grazed (e.g., grazed locations 520, 521, and 522 in FIG. 5. The plan 500 may also include locations in the field 510, such as a skipped zone 523, a high priority zone 524, a low priority zone 525, and a no grazing zone 526. This data may be implemented to determine a path, for example including a past grazing path 530 where the contained grazing paddock 20 has already been, and a next or upcoming grazing path 531.

The plan 500 may be based on any suitable information, including gathering field-specific data by the movable livestock grazing enclosure 10 and/or via separate device(s) such as monitoring station, along with external data (e.g., crop data, weather, etc.). It is noted that the example plan 500 is merely illustrative, and that any suitable plan may be implemented for operating the movable livestock grazing enclosure 10 for regenerative grazing in agriculture.

It is noted that the examples shown and described are provided for purposes of illustration and are not intended to be limiting. Still other examples are also contemplated.

The invention claimed is:

1. A movable livestock grazing enclosure for regenerative grazing in agriculture, comprising:
    a front boom;
    a first side boom and a second side boom both attached to the front boom to form a contained grazing paddock in a field to be grazed;
    a trough on at least one of the front boom, the first side boom, and the second side boom, the trough providing at least one of water, food, and food supplements for livestock;
    a seed distributing assembly to spread seed around the contained grazing paddock; and
    a head unit attached to the front boom, the head unit configured to move the contained grazing paddock to a predetermined location for grazing the livestock within the contained grazing paddock.

2. The movable livestock grazing enclosure of claim 1, further comprising a sprayer assembly to provide water for the livestock.

3. The movable livestock grazing enclosure of claim 1, further comprising at least one water tank.

4. The movable livestock grazing enclosure of claim 1, further comprising at least one of a feed tank and a feed supplement tank.

5. The movable livestock grazing enclosure of claim 1, further comprising a pivotable wheel assembly at a horizontal end of the front boom, the pivotable wheel assembly forming a support joint to a corresponding one of the first side boom and the second side boom.

6. The movable livestock grazing enclosure of claim 1, further comprising:
    a pivotable wheel support assembly at an end of the front first side boom and the second side boom, the pivotable wheel support assembly having at least one wire reel connected across a rear portion of the contained grazing paddock; and
    a wire extending between the at least one wire reel to enclose the contained grazing paddock along all sides.

7. The movable livestock grazing enclosure of claim 1, wherein the contained grazing paddock is sectioned for different types of livestock within the contained grazing paddock.

8. The movable livestock grazing enclosure of claim 1, wherein the head unit is configured for manual movement.

9. The movable livestock grazing enclosure of claim 1, wherein operation of the head unit is at least partly automated.

10. The movable livestock grazing enclosure of claim 1, wherein operation of the head unit is fully automated.

11. The movable livestock grazing enclosure of claim 1, wherein the head unit is programmed to move incrementally through the field to be grazed.

12. The movable livestock grazing enclosure of claim 1, further comprising an onboard power system for the head unit to move the head unit through the field to be grazed.

13. The movable livestock grazing enclosure of claim 1, further comprising a drive wheel of the head unit, the drive wheel controlled by an external source controller.

14. The movable livestock grazing enclosure of claim 13, wherein the external source controller includes a guidance system.

15. The movable livestock grazing enclosure of claim 14, wherein the guidance system tracks a path through the field to be grazed.

16. The movable livestock grazing enclosure of claim 14, wherein the guidance system controls speed and position of the contained grazing paddock in the field to be grazed based at least in part on grazing conditions of the field to be grazed.

17. The movable livestock grazing enclosure of claim 1, further comprising a plurality of barrier structures along at least a partial length of one of the booms to conform to a lay of the land and aid in maintaining the livestock within the contained grazing paddock as the contained grazing paddock passes over various contours in the land.

\* \* \* \* \*